(12) United States Patent
Shibamoto

(10) Patent No.: US 11,099,160 B2
(45) Date of Patent: Aug. 24, 2021

(54) MULTIDIMENSIONAL GAS CHROMATOGRAPH

(71) Applicant: SHIMADZU CORPORATION, Kyoto (JP)

(72) Inventor: Shigeaki Shibamoto, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 240 days.

(21) Appl. No.: 16/196,225

(22) Filed: Nov. 20, 2018

(65) Prior Publication Data

US 2019/0162706 A1    May 30, 2019

(30) Foreign Application Priority Data

Nov. 24, 2017   (JP) .............................. JP2017-225311

(51) Int. Cl.
*G01N 30/54*   (2006.01)
*G01N 30/60*   (2006.01)
(Continued)

(52) U.S. Cl.
CPC ........... *G01N 30/54* (2013.01); *G01N 30/465* (2013.01); *G01N 30/6039* (2013.01);
(Continued)

(58) Field of Classification Search
CPC .. G01N 30/6039; G01N 30/54; G01N 30/465; G01N 2030/3084
See application file for complete search history.

(56) References Cited

U.S. PATENT DOCUMENTS

| 5,492,555 A | 2/1996 | Strunk et al. |
| 9,759,697 B2* | 9/2017 | Gras .................... G01N 30/463 |
| 2017/0248558 A1* | 8/2017 | Roques ................ G01N 30/461 |

FOREIGN PATENT DOCUMENTS

| CN | 2520508 Y | 11/2002 |
| CN | 201607432 U | 10/2010 |

(Continued)

OTHER PUBLICATIONS

Communication dated Sep. 21, 2020, from The State Intellectual Property Office of the P.R. of China in Application No. 201810877349.1.

(Continued)

*Primary Examiner* — Paul M. West
(74) *Attorney, Agent, or Firm* — Sughrue Mion, PLLC

(57) ABSTRACT

Lowering of a switching recovery rate is suppressed without degrading separating ability in a second analytical column. A multidimensional GC includes a sample injector for injecting a sample, a first analytical column for separating the sample injected from the sample injector into one or more components, the first analytical column communicating with the sample injector, a detector for detecting the components of the sample separated in the first analytical column, a second analytical column provided separately from the first analytical column, a switching device connected to an outlet side of the first analytical column and configured to lead the sample out of the first analytical column to the detector or to the second analytical column, and a temperature adjuster configured to adjust temperature of the switching device to a predetermined temperature independently of a temperature of the first analytical column and a temperature of the second analytical column.

2 Claims, 3 Drawing Sheets

(51) Int. Cl.
   *G01N 30/46*  (2006.01)
   *G01N 30/02*  (2006.01)
   *G01N 30/30*  (2006.01)

(52) U.S. Cl.
   CPC ......... *G01N 30/463* (2013.01); *G01N 30/468* (2013.01); *G01N 2030/025* (2013.01); *G01N 2030/3084* (2013.01)

(56) References Cited

FOREIGN PATENT DOCUMENTS

| | | |
|---|---|---|
| JP | H09-145674 A | 6/1997 |
| JP | 2006-064646 A | 3/2006 |
| JP | 2009-121970 A | 6/2009 |
| JP | 2010-271241 A | 12/2010 |

OTHER PUBLICATIONS

Communication dated Mar. 2, 2021 issued by the Japanese Patent Office in counterpart Japanese Application No. 2017-225311.
Communication dated May 6, 2021, from the China National Intellectual Property Administration in application No. 201810877349.1.

* cited by examiner

MULTIDIMENSIONAL GAS CHROMATOGRAPH

BACKGROUND OF THE INVENTION

1. Field of the Invention

The present invention relates to a multidimensional gas chromatograph (hereinafter referred to as multidimensional GC).

2. Description of the Related Art

A gas chromatograph is known as an apparatus for carrying out quantitative analysis of components in a sample. In the gas chromatograph, a sample injected from a sample injector is vaporized and introduced into an analytical column, and each component separated in the analytical column is detected by a detector. However, depending on the sample, each component cannot be completely separated in one analytical column in some cases. In such a case, it is extremely useful to use a multidimensional GC.

A multidimensional GC has a first analytical column and a second analytical column in which the temperature thereof is adjusted independently of each other, and is configured in such a way that apart of the fluid that has passed through the first analytical column is cut out and introduced into the second analytical column (See JP 2010-271241 A). By changing the separation medium and the temperature condition between the first analytical column and the second analytical column, the sample components which could not be completely separated in the first analytical column can be completely separated in the second analytical column.

In such a multidimensional GC, a switching device is used to control whether or not to lead the fluid passed through the first analytical column to the second analytical column. As switching devices, devices adopting a method called Deans type or multi-Deans type are generally used (see JP 2006-064646 A).

A switching device of Deans type or multi-Deans type is configured to distribute and supply switching gas from a gas supply source to a first space connected to an outlet of a first analytical column and a second space connected to an inlet of a second analytical column, change the pressure balance between the first space and the second space by adjusting the distribution ratio thereof, and perform switching to determine whether or not the outflowing fluid from the outlet of the first analytical column is led to the second analytical column.

A detector for detecting a sample component flowing out of the first analytical column is connected to the first space, and when the pressure on the second space side is higher than the pressure on the first space side, the gas flowing out of the outlet of the first analytical column flows to the detector side without flowing to the second space side. Conversely, when the pressure on the first space side is higher than the pressure on the second space side, the gas flowing out of the outlet of the first analytical column flows to the second space side without flowing to the detector side.

In a multidimensional GC, it is important to increase the recovery rate (hereinafter referred to as switching recovery rate) of the eluted component peak to be cut out by the switching device in order to improve the analysis accuracy. When a part of the eluted component peak from the first analytical column to be introduced into the second analytical column flows to the detector and the switching recovery rate decreases, the peak area of the sample component separated in the second analytical column becomes smaller than the original one, which makes it impossible to accurately determine the peak component.

In a conventional multidimensional GC, the pressure balance between a first space and a second space in a switching device fluctuates due to some factors, resulting in a problem that the switching recovery rate decreases. By increasing the pressure difference between the first space and the second space when introducing the eluted component peak from the first analytical column to the second analytical column, it is possible to reliably introduce the eluted component peak from the first analytical column to the second analytical column side, to thereby increase the switching recovery rate. Therefore, it is conceivable to increase the pressure difference between the first space and the second space by increasing the switching gas pressure.

However, when the switching gas pressure is increased, while a high switching recovery rate is obtained, the inlet pressure of the second analytical column is increased so that the carrier gas linear velocity in the second analytical column is increased. This causes a problem that separation in the second analytical column has to be performed under a condition that greatly deviates from a condition exhibiting the optimum separating ability.

SUMMARY OF THE INVENTION

Therefore, an object of the present invention is to suppress deterioration in the switching recovery rate without degrading the separating ability in the second analytical column.

The present inventor has focused on a change in the pressure balance in a switching device due to a temperature fluctuation of the switching device. In a conventional multidimensional GC, a switching device is often accommodated in a first column oven that accommodates a first analytical column. In this case, the temperature of the switching device also changes with time according to a temperature adjustment program of the first analytical column. It has been found that when the temperature of the switching device changes, the balance of the fluid resistance in the switching device also changes, so that the pressure balance as designed cannot be obtained, and the switching recovery rate is changed during the analysis. Furthermore, it has been found that the switching recovery rate is lower as the switching device temperature is lower, and the switching recovery rate becomes the lowest at the initial temperature of the temperature elevation analysis. However, since a temperature adjustment program such as an initial temperature of an analytical column has the largest influence on the separation among the analysis conditions, it is difficult to change the temperature adjustment program to improve the switching recovery rate. The present invention has been made based on such findings.

A multidimensional GC according to the present invention includes a sample injector for injecting a sample, a first analytical column for separating the sample injected from the sample injector into one or more components, the first analytical column communicating with the sample injector, a detector for detecting the components of the sample separated in the first analytical column, a second analytical column provided separately from the first analytical column, a switching device connected to an outlet side of the first analytical column and configured to lead the sample out of the first analytical column to the detector or to the second analytical column, and a temperature adjuster configured to adjust the temperature of the switching device to a predetermined temperature independently of a temperature of the first analytical column and a temperature of the second analytical column.

That is, in the multidimensional GC of the present invention, the temperature of the switching device is kept constant at a predetermined temperature without being affected by a temperature adjustment program for the first analytical column and a temperature adjustment program for the second analytical column. As a result, the fluid resistance balance and the pressure balance in the switching device are stabilized, so that lowering of the switching recovery rate is suppressed.

In general, the multidimensional GC includes a first column oven for controlling the temperature of the first analytical column, the first column oven accommodating the first analytical column therein, and a second column oven for controlling the temperature of the second analytical column, the second column oven accommodating the second analytical column therein. In such a case, the temperature adjuster may be provided outside the first column oven and the second column oven.

Further, a multidimensional GC may have an interface oven for adjusting the temperature of pipes to a predetermined temperature, the pipes connecting the sample injector and the first analytical column, connecting the first analytical column and the switching device, connecting the switching device and the detector, and connecting the switching device and the second analytical column, respectively. In such a case, the switching device may be accommodated in the interface oven, and the temperature adjuster may be realized by the interface oven.

The temperature adjuster may be provided in the first column oven or the second column oven, and configured to accommodate the switching device in a space covered by a heat insulating material and adjust temperature inside the space independently of the temperature inside the first column oven and the temperature inside the second column oven.

A multidimensional GC may also include a pipe temperature adjuster for adjusting the temperature of a pipe, which is exposed to the outside of the first column oven and the second column oven, to a predetermined temperature. In such a case, the temperature adjuster may be provided integrally with the pipe temperature adjuster, and may be configured to adjust the temperature of the pipe and the temperature of the switching device to the predetermined temperature by means of a common heater. It is unnecessary to provide a dedicated heater for adjusting the temperature of the switching device, so that the cost can be reduced.

In the multidimensional GC according to the present invention, the temperature of the switching device is kept constant at a predetermined temperature without being affected by a temperature adjustment program for the first analytical column and a temperature adjustment program for the second analytical column. Accordingly, the fluid resistance balance and the pressure balance in the switching device are stabilized, and lowering of the switching recovery rate is suppressed. Since it is unnecessary to increase the flow rate of the switching gas of the switching device more than necessary, it is possible to separate the sample components under conditions in which good separating ability can be obtained in the second analytical column.

DETAILED DESCRIPTION OF THE INVENTION

Figure 1:
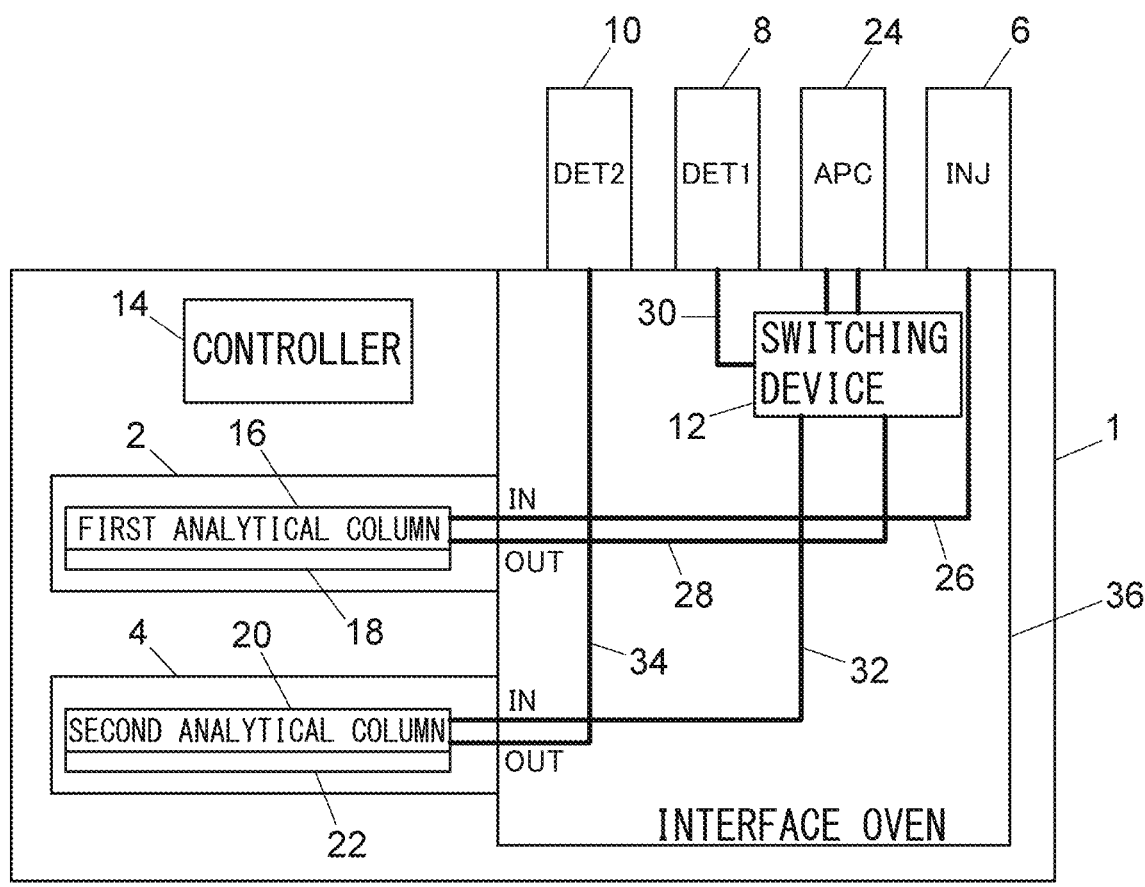
FIG. 1 is a schematic configuration diagram showing an embodiment of a multidimensional GC.

FIG. 1 shows a schematic configuration of an embodiment of a multidimensional GC.

A multidimensional GC 1 of this embodiment mainly includes a first column oven 2, a second column oven 4, a sample injector 6 (INJ), a first detector 8 (DET 1), a second detector 10 (DET 2), a switching device 12, a controller 14, and an interface oven 36.

The first column oven 2 and the second column oven 4 are of a cartridge type, and a chip type first analytical column 16 and a chip type second analytical column 20 are accommodated in the first column oven 2 and the second column oven 4, respectively. The first analytical column 16 and the second analytical column 20 are each configured in such a way that a separation medium is applied to a flow path formed in a substrate on, for example, a flat plate.

Heaters 18 and 22 are directly or indirectly in contact with the first analytical column 16 and the second analytical column 20, respectively. The first analytical column 16 and the second analytical column 20 are configured in such a way that the temperature thereof is independently adjusted by the heaters 18 and 22, respectively. Although not illustrated, the first column oven 2 and the second column oven 4 are provided with temperature sensors for detecting the temperature of the first analytical column 16 and the second analytical column 20, and output signals from the temperature sensors are taken into the controller 14.

The controller 14 is configured to control output of the heaters 18 and 22 so as to allow the temperature of the first analytical column 16 and the second analytical column 20 to become preset temperature according to temperature adjustment programs, respectively, based on the output of the respective temperature sensors of the first column oven 2 and the second column oven 4.

The inlet of the first analytical column 16 is connected to the sample injector 6 via a pipe 26, and the outlet of the first analytical column 16 is connected to the switching device 12 via a pipe 28. The switching device 12 is connected to the first detector 8 via a pipe 30, and is connected to the inlet of the second analytical column 20 via a pipe 32. The outlet of the second analytical column 20 is connected to the second detector 10 via a pipe 34.

The switching device 12 adopts a switching structure of Deans type or multi-Deans type. To the switching device 12, switching gas is supplied from a gas supply source 24 (APC). When the supply path of the switching gas is switched, the gas from the outlet of the first analytical column 16 is switched to be led to the first detector 8 side or to the inlet side of the second analytical column 20. The operation of the switching device 12 is controlled by the controller 14.

The switching device 12 is accommodated in an interface oven 36 together with the pipes 26, 28, 30, 32, 34, and the like. Although not illustrated, the interface oven 36 includes therein a heater, a fan, and a temperature sensor. The temperature inside the interface oven 36 is detected by the temperature sensor, and an output signal of the temperature sensor is taken into the controller 14. The controller 14 is configured to control the heater output and the rotational speed of the fan in the interface oven 36 in such a way that the temperature inside the interface oven 36 is maintained constantly at a preset temperature. In this embodiment, the interface oven 36 constitutes a temperature adjuster for adjusting the temperature of the switching device 12 to a predetermined temperature independently of a temperature of the first analytical column 16 and a temperature of the second analytical column 20.

It should be noted that the controller 14 is a function realized when a program is executed by an arithmetic element in a dedicated computer or a general-purpose personal computer.

The operation of the multidimensional GC 1 of this embodiment will be described.

A sample to be analyzed is injected through the sample injector 6. The sample injector 6 includes therein a sample vaporizing part for vaporizing the sample. The sample vaporized in the sample vaporizing part is introduced into the first analytical column 16 through a pipe 26 together with a carrier gas supplied to the sample injector 6. The sample components separated in the first analytical column 16 are introduced into the first detector 8 via the pipe 28 and the switching device 12, and are detected. The first detector 8 is, for example, a hydrogen flame ionization detector (FID).

In the case where there is a component which is not completely separated in the first analytical column 16, when a user specifies a peak portion thereof in advance, the controller 14 controls the operation of the switching device 12 in such a way that the designated peak portion of the outflowing gas from the first analytical column 16 is cut out and is introduced into the second analytical column 20. The eluted components introduced to the second analytical column 20 are separated in the second analytical column 20, and are introduced into the second detector 10 for detection. The second detector 10 is, for example, an FID.

As described above, the multidimensional GC 1 is configured to cut out a part of the outflowing gas from the first analytical column 16 and to lead it to the second analytical column 20 for separation, by performing switching on the switching device 12. However, the recovery rate (switching recovery rate) of the peak component to be cut out, when cutting out a part of the outflowing gas from the first analytical column 16, becomes a problem. When the pressure balance in the switching device 12 fluctuates, a part of the eluted component to be led to the second analytical column 20 side in the switching device 12 flows to the first detector 8 side, and the switching recovery rate deteriorates.

In this embodiment, the temperature inside the interface oven 36 provided with the switching device 12 is adjusted to a predetermined temperature independently of the first column oven 2 and the second column oven 4, and is not affected by the temperature adjustment programs of the first column oven 2 and the second column oven 4. Therefore, the temperature of the switching device 12 is maintained constant, and the pressure balance in the switching device 12 is stabilized.

Since it is empirically known that the switching recovery rate is better as the temperature of the switching device 12 is higher, a high switching recovery rate can be obtained when the temperature inside the interface oven 36 is set to a high temperature (for example, 150° C.)

Figure 3:
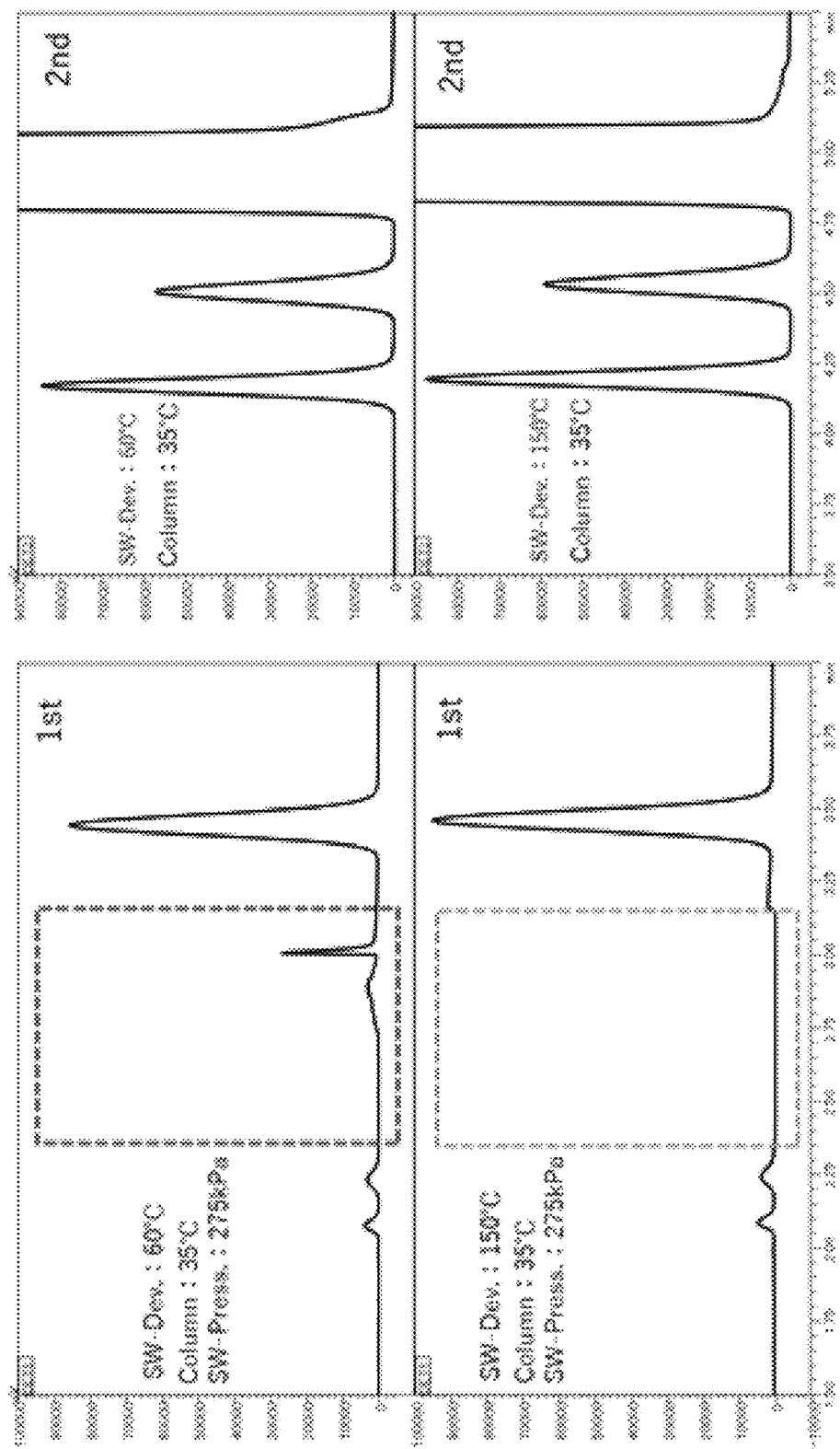
FIG. 3 shows comparison data of signal waveforms of a first detector and a second detector in the cases where the set temperature of an interface oven is 60° C. and 150° C. in the embodiment of FIG. 1.

FIG. 3 shows comparison data of signal waveforms of the first detector 8 and the second detector 10 in the cases where the set temperature of the interface oven 36 is 60° C. and 150° C., respectively. The upper stage of FIG. 3 shows signal waveforms of the first detector 8 (left side) and the second detector 10 (right side) when the set temperature of the interface oven 36 is 60° C., and the lower stage shows signal waveforms of the first detector 8 (left side) and the second detector 10 (right side) when the set temperature of the interface oven 36 is 150° C. The portions surrounded by broken lines in the waveforms of the first detector 8 are peak portions cut out by the switching device 12, and the signal waveforms of the second detector 10 are detection signal waveforms of the peak portions cut out by the switching device 12. The analysis conditions other than the temperature of the interface oven 36 are the same in the upper stage and the lower stage of FIG. 3.

As can be seen from the waveform on the left side in the upper stage of FIG. 3, when the set temperature of the interface oven 36 is 60° C., a part of the eluted component to be led to the second detector 10 side flows to the first detector 8 side, which appears as a small peak in the cutout portion surrounded by the broken line. On the other hand, when the set temperature of the interface oven 36 is 150° C., no peak appears in the cutout portion surrounded by the broken line, and all of the eluted components to be cut out are led to the second detector 10 side.

As described above, by maintaining the temperature of the switching device 12 independently of the first analytical column 2 and the second analytical column 4 at a high temperature, a high switching recovery rate can be achieved. Thereby, it is not necessary to increase the pressure of the switching gas more than necessary, and it is possible to carry out separation in the second analytical column 4 under optimal separation conditions.

In the embodiment described above, the switching device 12 is accommodated in the interface oven 36, whereby the temperature of the switching device 12 is stabilized. However, the present invention is not limited to this configuration. Any configuration may be adopted as long as the temperature of the switching device 12 can be adjusted independently of the first analytical column 2 and the second analytical column 4.

Figure 2:
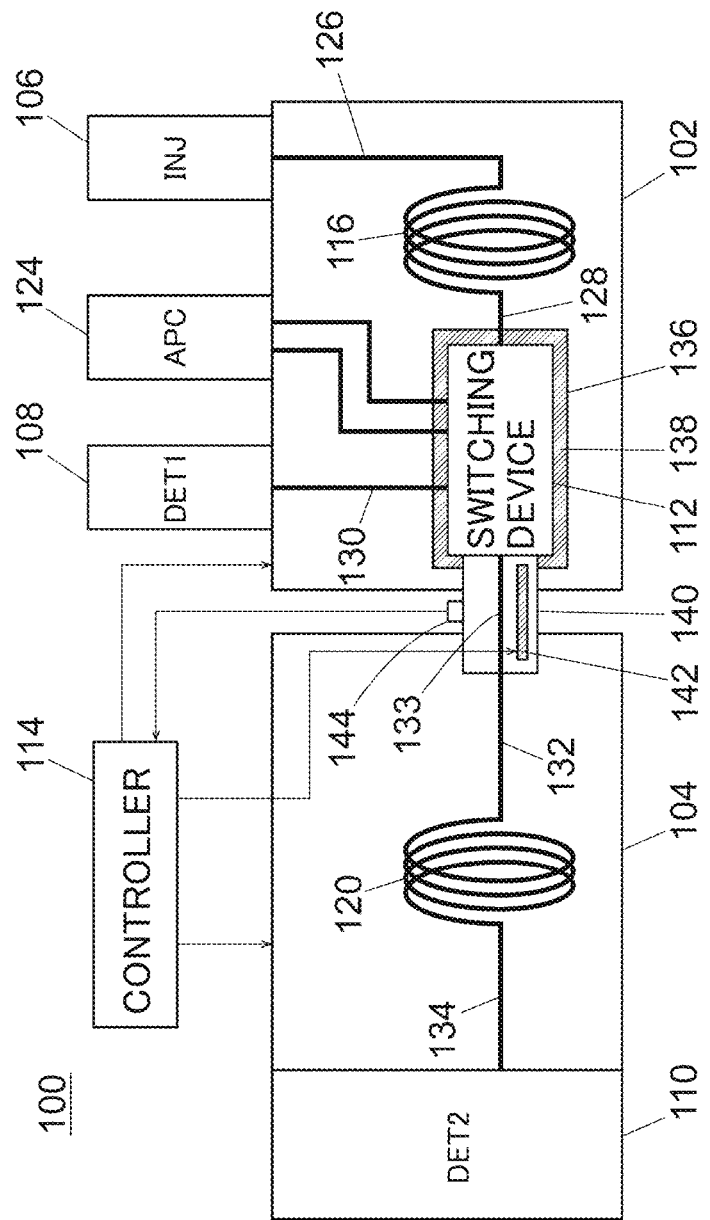
FIG. 2 is a schematic configuration diagram showing another embodiment of a multidimensional GC.

Next, an embodiment of a multidimensional GC having a structure different from that of the embodiment of FIG. 1 will be described with reference to FIG. 2.

A multidimensional GC 100 of this embodiment mainly includes a first column oven 102, a second column oven 104, a sample injector 106 (INJ), a first detector 108 (DET 1), a second detector 110 (DET 2), a switching device 112, and a controller 114.

The first analytical column 116 is accommodated in the first column oven 102 and the second analytical column 120 is accommodated in the second column oven 104. Although not illustrated, each of the first column oven 102 and the second column oven 104 includes therein a heater, a fan, and a temperature sensor. The first column oven 102 and the second column oven 104 are configured in such a way that the temperature inside the first column oven 102 and the second column oven 104 is adjusted independently from each other.

Output signals from the temperature sensors provided in the first column oven 102 and the second column oven 104 are taken into the controller 114. The controller 114 is configured to control output of the heaters and the rotational speed of the fans of the first column oven 102 and the second column oven 104 based on the outputs from the temperature sensors, in such a way that the temperature inside the first column oven 102 and the temperature inside the second column oven 104 become preset temperatures according to the temperature adjustment programs, respectively.

The inlet of the first analytical column 116 is connected to the sample injector 106 via a pipe 126, and the outlet of the first analytical column 116 is connected to the switching device 112 via a pipe 128. The switching device 112 is connected to the first detector 108 via a pipe 130, and is connected to the inlet of the second analytical column 120 via pipes 132 and 133. The outlet of the second analytical column 120 is connected to the second detector 110 via a pipe 134.

The pipe 133 connects the first column oven 102 and the second column oven 104, and is accommodated in a pipe temperature adjuster 140 so as not to be affected by a temperature fluctuation of the outside air. The pipe temperature adjuster 140 is made of a thermally conductive metal block in which a heater 142 is embedded. A temperature sensor 144 is attached to the pipe temperature adjuster 140, and an output signal from the temperature sensor 144 is taken into the controller 114. The controller 114 is configured to control output of the heater 142 in such a way that the temperature of the pipe 133 is kept constant at a predetermined temperature based on the output signal from the temperature sensor 144.

The switching device 112 employs a Deans type or multi-Deans type switching structure that is the same as that of the switching device 12 of the multidimensional GC 1 of FIG. 1. To the switching device 112, a switching gas is supplied from a gas supply source 124 (APC). When the supply path of the switching gas is switched, the gas from the outlet of the first analytical column 116 is switched to be led to the first detector 108 side or to the inlet side of the second analytical column 120. The operation of the switching device 112 is controlled by the controller 114.

The switching device 112 is provided in the first column oven 102 while being accommodated in the temperature adjuster 136. The temperature adjuster 136 has a space enclosed by a heat insulating material 138, and accommodates the switching device 112 in this space. In this embodiment, the temperature adjuster 136 is provided integrally with the pipe temperature adjusting part 140, and is configured to keep the temperature of the switching device 112 constant at a predetermined temperature by the heat of the pipe temperature adjuster 140. Since the periphery of the switching device 112 is covered with the heat insulating material 138, the temperature of the switching device 112 is adjusted to a predetermined temperature independently of the temperature inside the first column oven 102.

It should be noted that the controller 114 is a function realized when a program is executed by an arithmetic element in a dedicated computer or a general-purpose personal computer.

The multidimensional GC 100 of this embodiment performs the same operation as the multidimensional GC 1 of FIG. 1. That is, a sample injected through the sample injector 106 is introduced into the first analytical column 116 in a vaporized state through the pipe 126 together with a carrier gas. The sample components separated in the first analytical column 116 are introduced into the first detector 108 via the pipe 128 and the switching device 112, to be detected. The first detector 108 is, for example, an FID.

In the case where there is a component which is not completely separated in the first analytical column 116, when a user designates a peak portion thereof in advance, the controller 114 controls the operation of the switching device 112 in such a way that the designated peak portion of the outflowing gas from the first analytical column 116 is cut out and is introduced into the second analytical column 120. The eluted components led to the second analytical column 120 are separated in the second analytical column 120, and introduced into the second detector 110 to be detected. The second detector 110 is, for example, a mass spectrometer (MS).

Even in such a multidimensional GC 100, the temperature of the switching device 112 is adjusted to a predetermined temperature independently of the first column oven 102 and the second column oven 104, and is not affected by the temperature adjustment programs of the first column oven 102 and the second column oven 104. Therefore, the temperature of the switching device 112 is maintained constant, and the pressure balance in the switching device 112 is stabilized.

In this embodiment, the temperature adjuster 136 and the pipe temperature adjuster 140 are integrally formed, whereby the temperature of the switching device 112 is stabilized by utilizing the heat of the heater 142. However, the present invention is not limited to this configuration. The temperature adjuster 136 may independently include a heater and a temperature sensor. Although the temperature adjuster 136 is provided in the first column oven 102 in this embodiment, the temperature adjuster 136 may be provided in the second column oven 104, or may be provided outside the first column oven 102 and the second column oven 104. In short, it is sufficient that the temperature of the switching device 112 is adjusted to a predetermined temperature independently of the first analytical column 116 and the second analytical column 120.

What is claimed is:

1. A multidimensional gas chromatograph comprising:
   a sample injector for injecting a sample;
   a first analytical column for separating the sample injected from the sample injector into one or more components, the first analytical column communicating with the sample injector;
   a detector for detecting the components of the sample separated in the first analytical column;
   a second analytical column provided separately from the first analytical column;
   a switching device connected to an outlet side of the first analytical column and configured to lead the sample out of the first analytical column to the detector or to the second analytical column;
   a temperature adjuster configured to adjust temperature of the switching device to a predetermined temperature independently of a temperature of the first analytical column and a temperature of the second analytical column;
   a first column oven for controlling the temperature of the first analytical column, the first column oven accommodating the first analytical column therein; and
   a second column oven for controlling the temperature of the second analytical column, the second column oven accommodating the second analytical column therein,
   wherein the temperature adjuster is provided in the first column oven or the second column oven, and is configured to accommodate the switching device in a space covered by a heat insulating material and adjust temperature inside the space independently of the temperature inside the first column oven and the temperature inside the second column oven.

2. The multidimensional gas chromatograph according to claim 1, further comprising a pipe temperature adjuster for adjusting temperature of a pipe, exposed to an outside of the first column oven and the second column oven, to a predetermined temperature, wherein the switching device temperature adjuster is provided integrally with the pipe temperature adjuster, and is configured to adjust the temperature of the pipe and the temperature of the switching device to the predetermined temperature by means of a common heater.

\* \* \* \* \*